(12) United States Patent  
Ichikawa

(10) Patent No.: US 8,261,449 B2  
(45) Date of Patent: Sep. 11, 2012

(54) MANUFACTURING METHOD OF PLUGGED HONEYCOMB STRUCTURE

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1076 days.

(21) Appl. No.: 11/823,487

(22) Filed: Jun. 27, 2007

(65) Prior Publication Data

US 2008/0006972 A1    Jan. 10, 2008

(30) Foreign Application Priority Data

Jul. 4, 2006    (JP) .................................. 2006-184689

(51) Int. Cl.  
*B23P 15/16*    (2006.01)

(52) U.S. Cl. ...................... 29/896.62; 428/116; 264/630

(58) Field of Classification Search .............. 29/896.62; 264/630, 631; 428/116, 117  
See application file for complete search history.

(56) References Cited

U.S. PATENT DOCUMENTS

| | | | | |
|---|---|---|---|---|
| 3,674,526 A | * | 7/1972 | Self .............................. | 106/286.2 |
| 4,551,295 A | * | 11/1985 | Gardner et al. ............ | 264/177.11 |
| 4,557,962 A | * | 12/1985 | Belmonte et al. ............. | 428/117 |
| 4,715,801 A | * | 12/1987 | Montierth ..................... | 425/110 |
| 5,021,204 A | * | 6/1991 | Frost et al. .................... | 264/630 |
| 5,876,831 A | * | 3/1999 | Rawal ............................ | 428/117 |
| 7,033,452 B2 | * | 4/2006 | Yamada et al. ............ | 156/89.22 |
| 2005/0210848 A1 | | 9/2005 | Kuki et al. | |
| 2006/0029769 A1 | * | 2/2006 | Ichikawa et al. ............. | 428/116 |
| 2007/0184241 A1 | * | 8/2007 | Ichikawa ...................... | 428/117 |

FOREIGN PATENT DOCUMENTS

| | | | |
|---|---|---|---|
| JP | A-1-297114 | | 11/1989 |
| JP | 10099626 A | * | 4/1998 |
| JP | A-10-099626 | | 4/1998 |
| JP | A 2001-300922 | | 10/2001 |
| JP | A 2005-270755 | | 10/2005 |
| JP | A-2006-167680 | | 6/2006 |

OTHER PUBLICATIONS

Jp-10099626-A Machine Translation.*

* cited by examiner

*Primary Examiner* — David Bryant  
*Assistant Examiner* — Jacob Cigna  
(74) *Attorney, Agent, or Firm* — Oliff & Berridge, PLC

(57) ABSTRACT

There is disclosed a manufacturing method of a plugged honeycomb structure so that the plugged honeycomb structure for use in a filter or the like having reduced deposits deposited on an end surface of the structure can easily be manufactured with low cost and so that a plugging depth of a slurry-like plugging member at an outer peripheral portion of the honeycomb structure can easily be set to be uniform. In the manufacturing method of the plugged honeycomb structure in which plugging portions are formed at opening end portions of predetermined cells on one side of a cylindrical honeycomb structure including a plurality of cells separated from one another by porous partition walls, constituting channels of a fluid and formed in a honeycomb-like shape, plugging members which are formed into a predetermined shape and which are to be inserted into cell passages to be plugged include a plastic material having viscosity and fluidity.

8 Claims, 5 Drawing Sheets

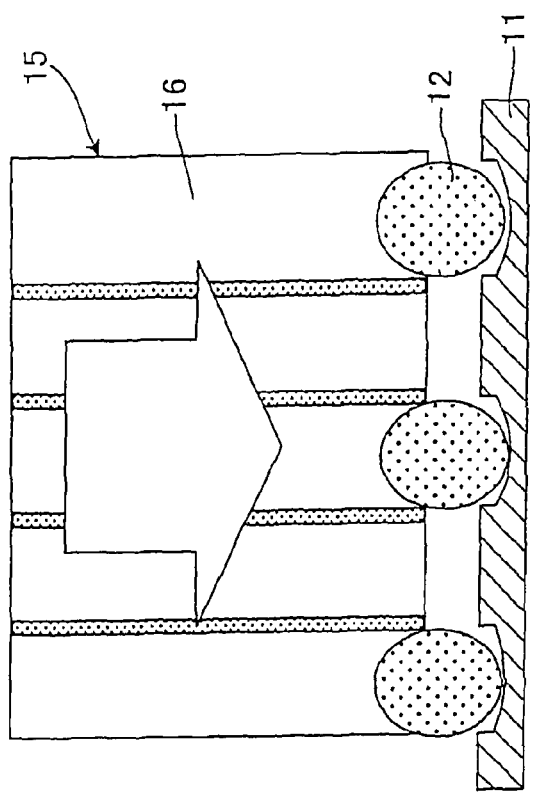
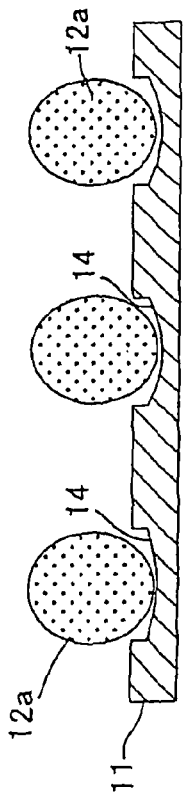
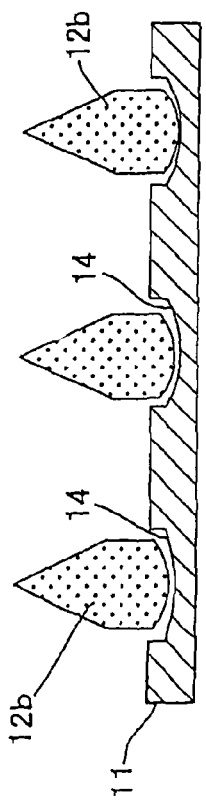
FIG.1 (a)
FIG.1 (b)
FIG.1 (c)

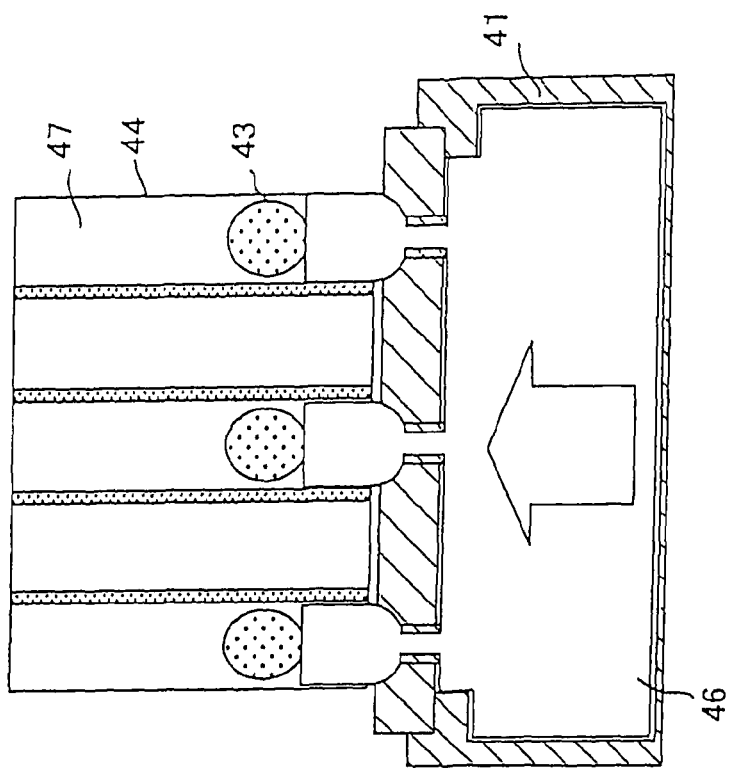
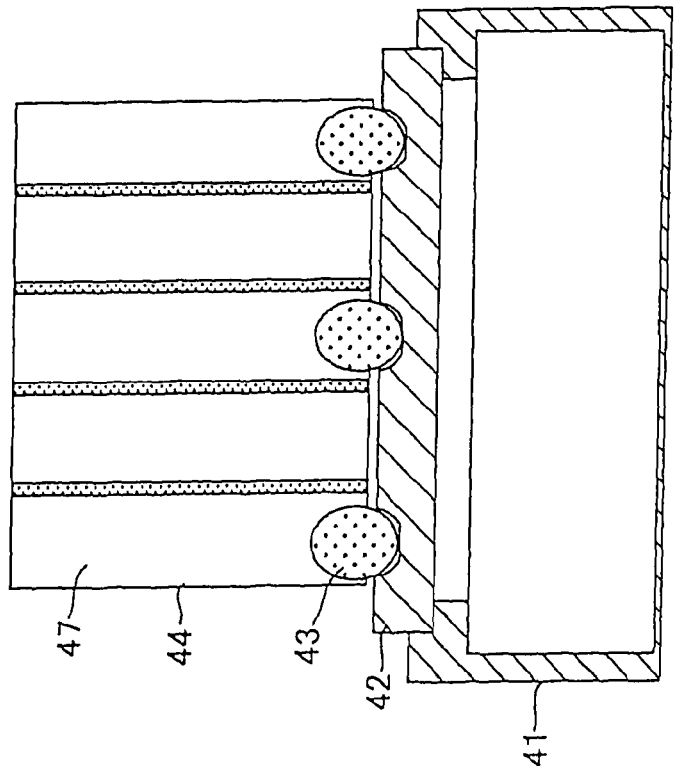
FIG. 4 (a)
FIG. 4 (b)

MANUFACTURING METHOD OF PLUGGED HONEYCOMB STRUCTURE

BACKGROUND OF THE INVENTION

1. Field of the Invention

The present invention relates to a manufacturing method of a plugged honeycomb structure. Particularly, it relates to a manufacturing method of a plugged honeycomb structure in which the plugged honeycomb structure having reduced deposits deposited on an end surface thereof when used as a filter or the like can easily be manufactured with low cost. More particularly, it relates to a manufacturing method of a plugged honeycomb structure in which a plugging depth of a honeycomb structure can easily be set to be uniform.

2. Description of the Related Art

In recent years, in various fields of chemistry, electric power, iron and steel and industrial waste disposal, a plugged honeycomb structure made of a ceramic having excellent resistances to heat and corrosion is used as a filter for dust collection to be used in applications including an environmental countermeasure such as pollution prevention, and recovery of a product from a high-temperature gas. For example, such a plugged honeycomb structure is preferably used as the filter for dust collection to be used in a corrosive gas atmosphere at a high temperature, for example, a diesel particulate filter (DPF) which traps particulates to be discharged from a diesel engine (e.g., Patent Document 1).

As shown in FIG. 5, a plugged honeycomb structure for use as the above filter for dust collection includes a cylindrical honeycomb structure 23 having porous partition walls 22 by which a plurality of cells 24 are separated from one another to constitute channels of a fluid, and plugging members 26 which plug openings of predetermined cells on one side of the structure and which plug openings of remaining cells on the other side of the structure. In a plugged honeycomb structure 21 shown in FIG. 5, inlet-side end surfaces B and outlet-side end surfaces C of the plurality of cells 24 are alternately in a checkered pattern plugged by the plugging members 26.

The above plugged honeycomb structure 21 can be manufactured by obtaining a cylindrical non-fired honeycomb structure having porous partition walls by which the plurality of cells are separated from one another to constitute the channels of the fluid by extrusion forming. Subsequently, the openings of the predetermined cells on one side and the openings of the remaining cells on the other side of the resultant non-fired honeycomb structure or the honeycomb structure obtained by firing the non-fired honeycomb structure are filled with a plugging slurry including a ceramic. Afterward, the structure is fired.

Furthermore, as a manufacturing method of the plugged honeycomb structure for use as the above filter for dust collection, a method is proposed in which, for example, an adhesive sheet or the like is attached to one end surface of a formed honeycomb body as a non-fired ceramic dry body, and holes are made at portions of the adhesive sheet or the like corresponding to the cells to be plugged (plugged cells) by laser processing or the like by use of image processing. The end surface of the formed honeycomb body to which the adhesive sheet or the like is attached as a mask is submerged into a slurry (a ceramic slurry). The plugged cells of the formed honeycomb body are filled with the slurry to form the plugging portions. The other end surface of the formed honeycomb body is subjected to a step similar to the above step. Subsequently, the body is dried and fired to thereby obtain the plugged honeycomb structure (e.g., Patent Document 1).

Patent Document 1: Japanese Patent Application Laid-Open No. 2001-300922

Patent Document 2: Japanese Patent Application Laid-Open No. 2005-270755

In the above manufacturing method of the plugged honeycomb structure, to set depths of the plugging portions to be uniform, it is demanded that the openings be uniformly plugged with a slurry-like plugging member including the ceramic slurry. Therefore, a liquid surface of the slurry-like plugging member in a container in which the slurry-like plugging member including the ceramic slurry is stored needs to be leveled. However, even in a step of leveling the liquid surface of the slurry-like plugging member, the slurry-like plugging member escapes toward a side surface of the honeycomb structure at an outer peripheral portion of the honeycomb structure. Therefore, a problem that the penetration depth of the plugging portion obtained by the slurry-like plugging member at the outer peripheral portion of the honeycomb structure often becomes insufficient remains unsolved.

SUMMARY OF THE INVENTION

The present inventor has noted a composition of a plugging member of a honeycomb structure. As a result of intensive researches, it is considered that a problem to be solved is to provide a simple plugging method in which depths of the plugging portions of the honeycomb structure are easily set to be uniform and in which a liquid surface of a slurry-like plugging member in a container to store the slurry-like plugging member does not have to be leveled and in which the depth of each plugging portion can easily be regulated into a uniform depth. The present inventor has developed the present invention.

To achieve the above problem, according to the present invention, the following manufacturing method of a plugged honeycomb structure is provided.

[1] A manufacturing method of a plugged honeycomb structure in which plugging portions are formed at opening end portions of predetermined cells on one side of a cylindrical honeycomb structure including a plurality of cells separated from one another by porous partition walls, constituting channels of a fluid and formed in a honeycomb-like shape, wherein plugging members which are formed into a predetermined shape and which are to be inserted into cell passages to be plugged include a plastic material having viscosity and fluidity.

[2] The manufacturing method of the plugged honeycomb structure according to the above [1], wherein the plugging members include a thermally foamable resin and/or a water-absorbing resin.

[3] The manufacturing method of the plugged honeycomb structure according to the above [1] or [2], wherein the plugging members include a gelatinous substance.

[4] The manufacturing method of the plugged honeycomb structure according to any one of the above [1] to [3], wherein the plugging members include at least one selected from the group consisting of gelatin, agar, bean curd, devil's-tongue starch, starch and silica gel.

[5] The manufacturing method of the plugged honeycomb structure according to any one of the above [1] to [4], wherein the plugging members reach predetermined positions in the cell passages and then expand by heating or absorbed water, whereby the plugging portions are formed by being easily fixed in the cell passages.

[6] The manufacturing method of the plugged honeycomb structure according to any one of the above [1] to [5], wherein after arranging the plugging members on a holding portion of a stationary mold having the holding portion corresponding to a predetermined plugging pattern, the stationary mold is pressed onto an end surface of the honeycomb structure to insert the plugging members into end portions of the cell passages to be plugged and form the plugging portions.

[7] The manufacturing method of the plugged honeycomb structure according to any one of the above [1] to [6], wherein the plugging members are inserted into middle portions of the cell passages to be plugged to form the plugging portions.

According to the manufacturing method of the present invention, the following effects are produced.

That is, the plugging members include the plastic material having the viscosity and fluidity, a polymer material having a volume thereof increased by the heating and/or the added water, and the gelatinous substance. Therefore, the plugging member can easily be inserted into the cell passages of the honeycomb structure. After the insertion, the plugging members expand by heating and watering the inserted plugged member after the insertion, thereby, the plugging members are easily formed in the cell passages by being easily fixed. Owing to these functions, depths of the plugging portions can easily be set to be uniform. Moreover, an unsolved problem that the depth of the plugging portion formed by the slurry-like plugging member easily decreases at an outer peripheral portion of the honeycomb structure can be solved. Furthermore, the depths of the plugging portions can easily be regulated.

BRIEF DESCRIPTION OF THE DRAWINGS

FIGS. 1(a), (b) and (c) are schematic diagrams showing steps of arranging plugging members in a stationary mold and then press-fitting the plugging members into honeycomb cells according to one embodiment of the present invention;

FIGS. 4(a), (b) are schematic diagrams showing steps of plugging inner portions of cells of a honeycomb structure according to a further embodiment of the present invention.

EXPLANATION OF SYMBOLS

Figure 2:
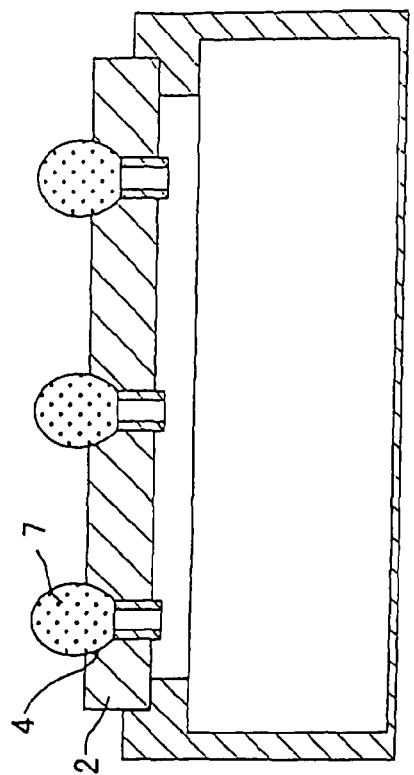
FIGS. 2(a), (b) and (c) are schematic diagrams showing steps of arranging plugging members in a stationary mold including lower and upper molds and then press-fitting the plugging members into honeycomb cells according to another embodiment of the present invention.
Figure 2:
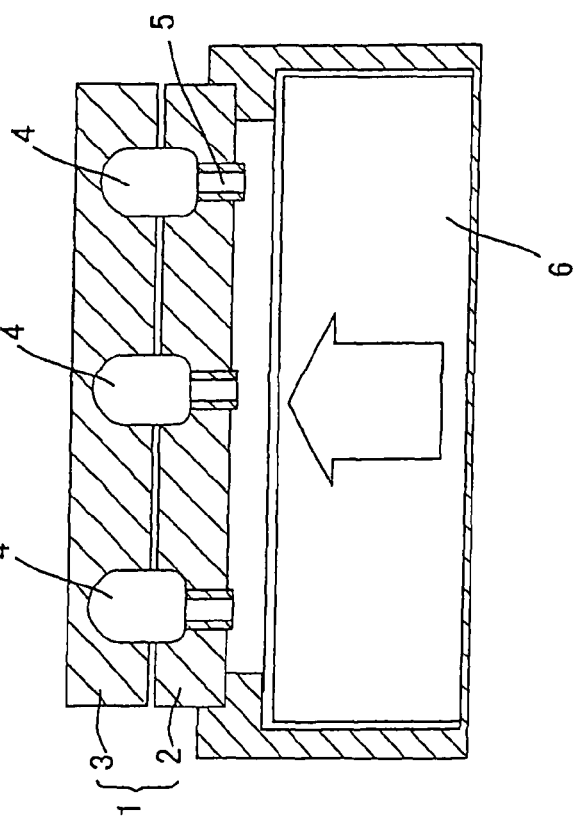
Figure 2:
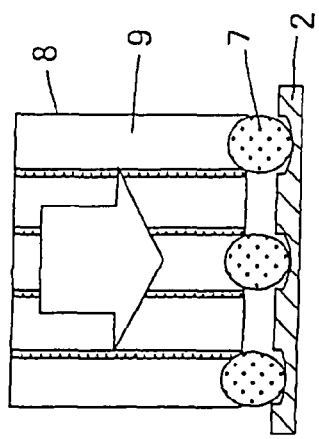

2: lower mold, 3: upper mold, 4: cavities, 5: tubular portions, 6: plugging members storage portion, 7: plugging members, 8: honeycomb structure, 9: cells, 10: stationary mold, 11: stationary mold, 12(12a,12b): plugging members, 14: depressions, 15: honeycomb structure, 16: cells, 21: plugged honeycomb structure, 22: porous partition walls, 23: honeycomb structure, 24: cells, 26: plugging members, B: inlet-side end surfaces, C: outlet-side end surfaces, 32: push-up rod holding plate, 33: push-up rods, 34: stationary mold, 35: plugging members, 36: honeycomb structure, 37: cells, 41: fluid storage portion, 42: stationary mold, 43: plugging members, 44: honeycomb structure, 46: pressurized fluid, 47: cells

DESCRIPTION OF THE PREFERRED EMBODIMENT

Embodiments of a manufacturing method of a plugged honeycomb structure according to the present invention will hereinafter be described in detail with reference to specific configurations of the present invention shown in FIGS. 1(a), (b) and (c) to FIGS. 4(a), (b). However, the present invention is not limited by these embodiments when interpreted, and can variously be changed, modified and improved based on knowledge of a person skilled in the art without departing from the scope of the present invention.

A plugging member for use in the present invention is prepared by adding a plastic material having viscosity and fluidity to powder of a ceramic for a slurry. The plastic material having the viscosity and fluidity is a substance such as a synthetic resin, plastic, synthesized polymer, natural polymer or inorganic polymer which has plasticity and which indicates the viscosity and fluidity as it is or by given heat or water. Examples of the plastic material include a thermoplastic resin. The thermoplastic resin is generally a resin which is heated to a glass transition temperature or a melting point to soften and which can be formed into a target shape. The thermoplastic resin has a characteristic that the resin is easily fluidized when heated. Examples of the thermoplastic resin include polyethylene, polypropylene, polyvinyl chloride, polyvinylidene chloride, polystyrene, polyvinyl acetate and acrylic resin.

Furthermore, it is preferable that the plugging member for use in the present invention includes a thermally foamable resin and/or a water-absorbing resin. The thermally foamable resin and/or the water-absorbing resin is a polymer material having a volume thereof increased by heating swelling, heating foam, water absorption swelling or the like. Examples of the polymer material include a water-absorbing polymer material, a thermally foamable polymer material and a wettable polymer material.

The water-absorbing polymer is generally a polymer having a property that, when the polymer comes in contact with liquid or water, the polymer absorbs the water in a short time to expand. Some of such polymers can absorb the water as much as hundred times to thousands of times its own weight. A polymer having a property that powder of the polymer having a weight of 1 g absorbs one liter of water momentarily, gelatinizes and exhibits the fluidity and plasticity is especially sometimes referred to as a highly water-absorbing resin.

The water-absorbing polymer has such a property as to absorb water, swell and hydro-gel. In general, the swelling is a phenomenon in which gel absorbs a liquid to increase a volume thereof. It is interpreted that examples of the phenomenon include a state in which, when the gel swells owing to the water, water molecules enter gaps among high molecules, and a force to expand the gap between the molecules is balanced with elasticity of cross-linked mesh.

Examples of the water-absorbing polymer include an alkali hydrolytic substance of a starch-acrylonitrile copolymer, a sodium acrylate-functional monomer copolymer, a starch-sodium acrylate copolymer, carboxymethyl cellulose, an alkali saponified substance of vinyl alcohol-acrylic acid copolymer, and an alkali saponified substance of polyacrylic acid.

The thermally foamable polymer is a thin hollow resin spherical shell containing a gas, and has a property that the resin spherical shell expands owing to expansion of the gas, when heated at 100 to 200° C. Examples of the polymer material which increases a foam property and volume thereof, when heated, include polystyrene, a styrene-ethylene copolymer, polyurethane and a urethane-ethylene copolymer.

Furthermore, the plugging member for use in the present invention is prepared by adding a gelatinous substance thereto. The gel is generally a state in which colloidal particles gather and solidify with independent mobility. Examples of the gelatinous substance preferably include gelatin, agar, bean curd, devil's-tongue starch, starch and silica gel. In the present invention, these substances may be used alone in the plugging member, or may be combined for use. Among these substances, the gelatin, agar, starch and silica gel are preferable, because they are industrially obtainable with constant quality. For example, the gelatin swells owing to water. When the gelatin is heated or dissolved in hot water, it is dispersed and changed from a gel state to a sol state. The sol of the gelatin has the viscosity and fluidity, but solidifies and gelatinizes when cooled.

In the present invention, a stationary mold having a holding portion corresponding to a predetermined plugging pattern is formed. As shown in FIGS. 1(a), (b) and (c), a stationary mold 11 may be a plate-like member provided with depressions 14. In the stationary mold, as shown in FIGS. 2(a), (b) and (c), cavities 4 are formed between two plate-like members 2 and 3. When the plugging members are fixed to the stationary mold, the gelatinous substance included in the plugging members can solidify to fix the members. Therefore, the members can easily be pushed into desired cells. When the plugging members are press-fitted into cells of a honeycomb structure, the members are heated. In consequence, for example, the gelatinous substance included in the plugging members can be provided with fluidity. Therefore, when the plugging members are pressed into predetermined positions of the cells of the honeycomb structure, predetermined plugging portions are easily formed.

In the present invention, the plugging members can be fixed at inlets of cell passages but also predetermined positions in the cell passages. For example, by fluidity of the heated plugging members, mechanical push-in with a push-up rod, or compression of a volume-increasing polymer resin of the plugging member, the plugging members are fixed at the inlets of the cells or the predetermined positions in the cells. In consequence, depths of the plugging portions can easily be set to be uniform. Moreover, the depths of the plugging portions can easily be regulated.

A cylindrical honeycomb structure in which a plurality of cells are separated from one another by porous partition walls, constitute channels of a fluid and are formed in a honeycomb-like shape is manufactured by a method described in, for example, Patent Document 2. For example, a forming material including a ceramic is extruded and formed. In consequence, a non-fired honeycomb structure including the porous partition walls by which the plurality of cells are separated from one another to constitute the channels of the fluid can be obtained. As the forming material including the ceramic, a material obtained by adding a binder, a dispersion medium or the like to powder of the ceramic and kneading the resultant material may preferably be used. The examples of the ceramic include cordierite, mullite, alumina, spinel, silicon carbide, silicon nitride, lithium aluminum silicate and aluminum titanate. There is not any special restriction on an extrusion forming method. However, for example, a known conventional method such as extrusion forming by use of a vacuum extrusion forming machine may be used.

Steps of the present invention will hereinafter be described with reference to FIGS. 1(a), (b) and (c) to FIGS. 4(a) and (b). The steps include forming of the plugging members on the stationary mold and press-fitting of the members into the cells of the honeycomb structure.

FIGS. 1(a), (b) and (c) are schematic diagrams showing steps of arranging the plugging members on the stationary mold and then press-fitting the plugging members into the honeycomb cells. In FIGS. 1(a) and (b), reference numeral 11 is a stationary mold. The plugging members 12 (12a, 12b) are fixed to the stationary mold 11. As shown in FIG. 1(a), plugging members 12a have a ball-like shape. As shown in FIG. 1(b), plugging members 12b have pointed tip ends. The shape having a tapered tip end is especially preferable, because the members having such a shape can easily be press-fitted into the cells. As shown in FIG. 1(c), the plugging members 12 fixed to the stationary mold 11 are pressed onto an end surface of a honeycomb structure 15. In consequence, the plugging members 12 are press-fitted into cells 16.

FIGS. 2(a), (b) and (c) show an example in which a stationary mold 1 includes the lower mold 2 and the upper mold 3, and are provided with the cavities 4. As shown in FIGS. 2(a) and (b), the cavities 4 are connected to a plugging member storage portion 6 via tubular portions 5 disposed in the lower mold 2 of the stationary mold 1. Moreover, as shown in FIG. 2(a), a plugging member 7 is pressurized to pass from the plugging member storage portion 6 to the cavities 4 of the stationary mold 1 through the tubular portions 5, and the plugging members 7 are formed in the cavities 4 of the stationary mold 1. Subsequently, as shown in FIG. 2(b), the upper mold 3 of the stationary mold 1 is removed. In consequence, the plugging members 7 are fixed to the lower mold 2 of the stationary mold 1. Subsequently, as shown in FIG. 2(c), when the plugging members 7 fixed to the stationary mold 1 are pressed onto an end surface of a honeycomb structure 8, the plugging members 7 are press-fitted into cells 9, and end surface portions of the structure are plugged.

Figure 3:
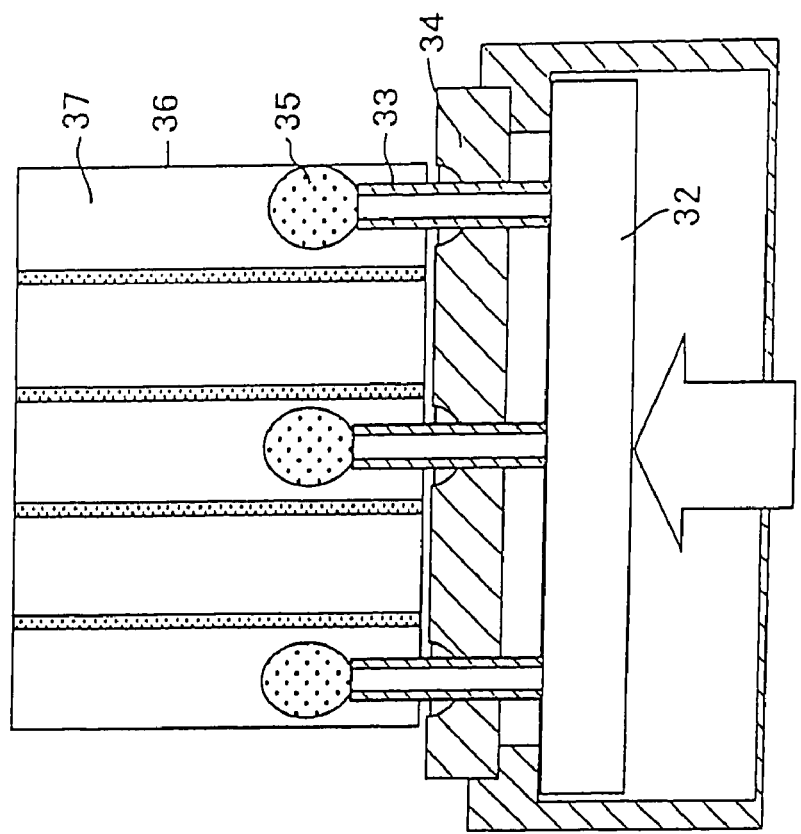
FIGS. 3(a), (b) are schematic diagrams showing steps of press-fitting plugging members arranged on a stationary mold into cells of a honeycomb structure to plug inner portions of the cells according to still another embodiment of the present invention.
Figure 3:
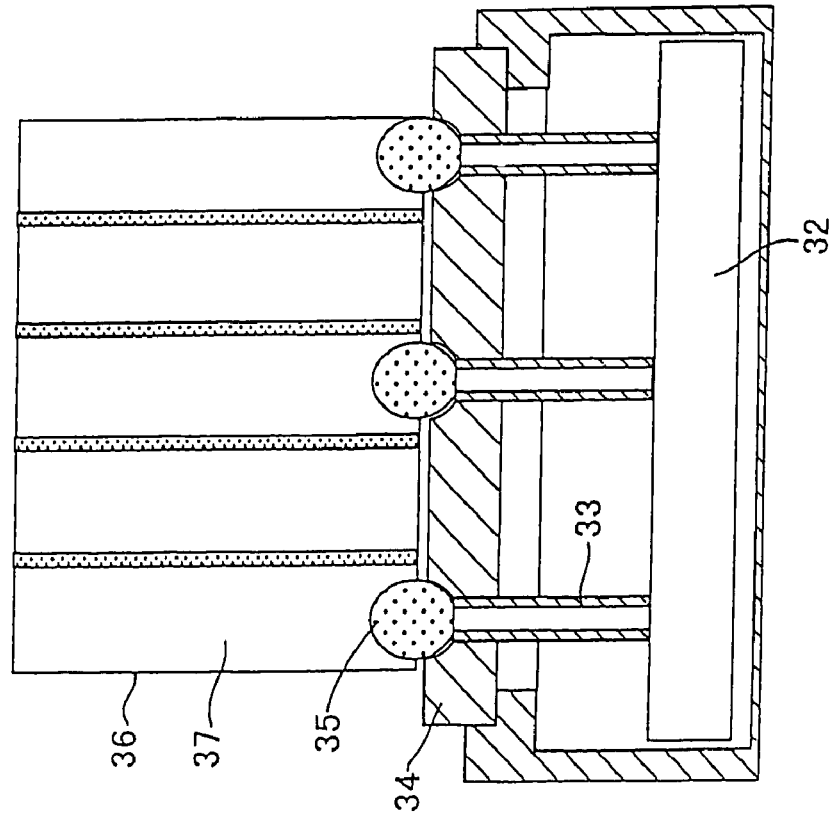
Figure 5:
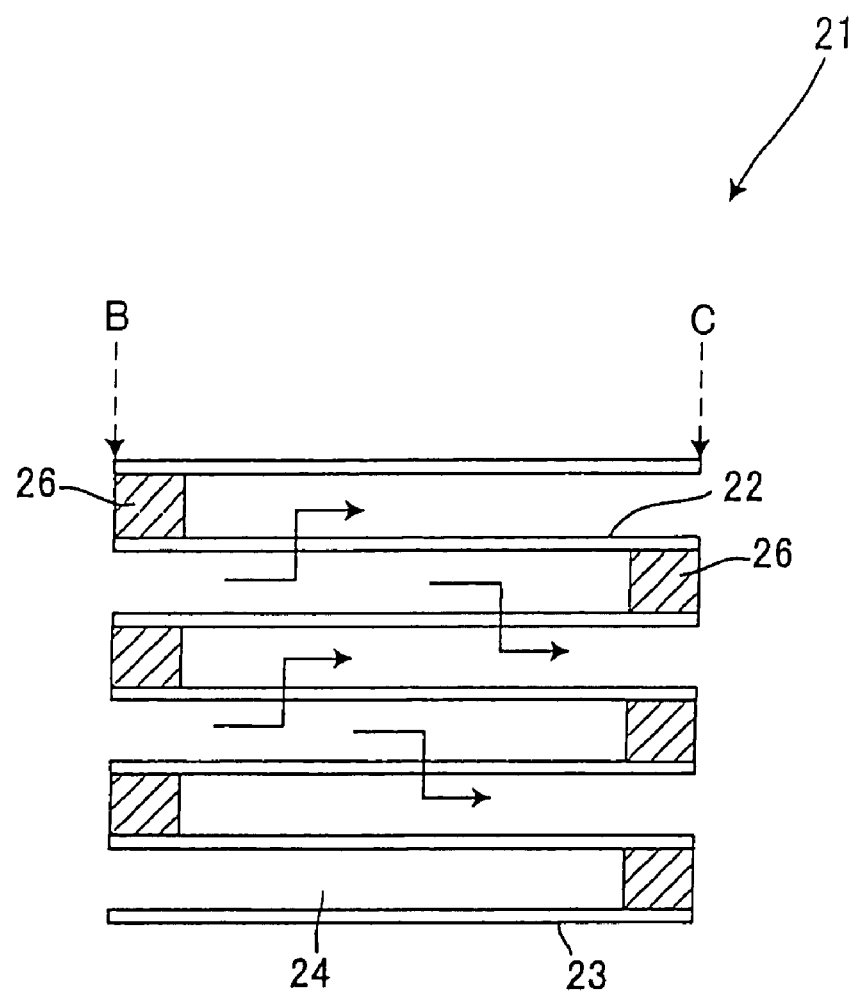
FIG. 5 is a sectional view showing a constitution of a plugged honeycomb structure.

FIGS. 3(a), (b) show one embodiment in which plugging members 35 arranged on a stationary mold 34 are press-fitted into cells 37 of a honeycomb structure 36 to plug inner portions of the cells 37. In this embodiment, when a push-up rod holding plate 32 is mechanically pushed up, the plugging members 35 are pushed into predetermined positions in passages of the cells 37 by push-up rods 33. Moreover, when the plugging members 35 reach the predetermined positions in the passages of the cells 37, water supplied to the plugging members 35 through the push-up rods 33 is absorbed by a water-absorbing polymer resin added to the plugging members 35. In consequence, the resin swells to expand the plugging members 35, and the plugging members 35 are fixed in the cells 37 to plug the cells. When a thermally foamable resin is added to the plugging members 35 and the plugging members 35 reach the predetermined positions in the passages of the cells 37, the plugging members 35 are heated at a predetermined temperature or more and expanded. As a result, the plugging members 35 are fixed in the cells 37 to plug the cells.

FIGS. 4(a), (b) show another embodiment in which cells of a honeycomb structure 44 are plugged at inner portions of the cells in the same manner as in FIGS. 3(a) and (b). This embodiment shows an example in which plug pushing means are pushed inwardly by a pressurized fluid such as pressurized air. Plugging members 43 arranged on a stationary mold 42 are pushed into predetermined positions of passages of the cells of the honeycomb structure 44 by a pressurized fluid 46 stored in a fluid storage portion 41. Even in this case, when the plugging members 43 reach the predetermined positions in the passages of cells 47, water is supplied to the pressurized fluid 46 to swell a water-absorbing polymer resin added to the plugging members 43. In consequence, the plugging members 43 are expanded to fix the plugging members 43 in the cells 47, thereby plugging the cells. In a case where a thermally foamable resin is added to the plugging members 43, when the plugging members 43 reach the predetermined positions in the passages of the cells 47, the plugging members 43 are heated at a predetermined temperature or more and expanded. As a result, the plugging members 43 are fixed in the cells 47 to plug the cells.

A method of pushing the plugging members mechanically by use of the push-up rods, or a method of pushing the members by a pressurized fluid such as pressurized air is applicable to not only the press-fitting of the members into the cells but also the fixing of the members at inlets of the passages of the cells. When a pressure of each push-up rod, addition of the water to the water-absorbing polymer resin or the heat to be give to the thermally foamable resin is regulated, the plugging members can be fixed at the predetermined positions of the cells.

Plugging members coated with a thin resin may be used. In this case, when the plugging members reach the predetermined positions in the passages of the cells, the coating resin is eluted by heating. In consequence, the plugging portions are formed in the cells.

In the present invention, there is not any special restriction on a type of powder of a cell for a slurry for use in the plugging members. For example, powder similar to or different from that of the ceramic included in a forming material from which the honeycomb structure is extruded and formed may be used.

In the embodiment of the present invention, a material obtained by adding a binder, a dispersion medium or the like to the powder of the ceramic, for example, powder of cordierite and kneading the powder may preferably be used as a slurry-like plugging member. For example, water, binder and glycerin can be added to the cordierite powder to prepare the plugging member.

Moreover, the honeycomb structure of the embodiment of the present invention is a cylindrical honeycomb structure having porous partition walls and a plurality of cells separated from one another by the partition walls to constitute channels of the fluid. In a material of the honeycomb structure of the present invention, from viewpoints of strength, heat resistance and the like, it is preferable to use, as a main crystal phase, one selected from the group consisting of cordierite, silicon carbide, alumina, mullite, aluminum titanate and lithium aluminum silicate (LAS). It is to be noted that, when the same slurry as that of the honeycomb structure is used in the slurry-like plugging member, an effect that a thermal expansion coefficient of the member agrees with that of the structure is produced. The honeycomb structure has a circular sectional shape (a shape of a bottom surface) vertical to a central axis, but the sectional shape may be, for example, an elliptic shape, an oblong shape, a polygonal shape such as a rectangular shape, a heteromorphy shape or the like. Moreover, there is not any special restriction on a sectional shape of the cell (a section vertical to an axial direction of the honeycomb structure). A rectangular cell section is preferable, but the section may have a polygonal shape such as a triangular shape or a hexagonal shape. There is not any special restriction on porosity or average pore diameter of the partition wall. The porosity and average pore diameter of the partition wall may be those of a ceramic usable in treatment of an exhaust gas or the like. There is not any special restriction on a thickness of the partition wall. However, if this partition wall is excessively thick, a pressure loss during permeation of the fluid sometimes increases. If the partition wall is excessively thin, a mechanical strength becomes insufficient. The thickness of the partition wall is preferably 100 to 1000 µm, further preferably 200 to 800 µm. There is not any special restriction on cell density, but the cell density is preferably 5 to 300 cells/cm$^2$, further preferably 10 to 100 cells/cm$^2$, especially preferably 15 to 50 cells/cm$^2$.

There is not any special restriction on a method of drying the plugging members. However, examples of the method include a method of arranging the members on a hot plate or the like to dry the members and a hot air drying method of blowing hot air to dry the members. Moreover, microwave drying, far infrared drying, electric heater drying or the like may be used.

The resultant plugged honeycomb structure precursor is fired to obtain the plugged honeycomb structure. There is not any special restriction on a method of firing the plugged honeycomb structure precursor. The firing may be performed according to a firing step of a known conventional manufacturing method of the plugged honeycomb structure. According to such a manufacturing method of the plugged honeycomb structure, the plugged honeycomb structure for use in, for example, a dust collecting filter or the like can easily be manufactured with low cost so that deposits deposited on an end surface of the structure are reduced.

Moreover, in the manufacturing method of the plugged honeycomb structure according to the present embodiment, an end surface seal member formed of a combustible substance may be used. In this case, when the plugged honeycomb structure precursor is fired, the end surface seal member disappears. By employing such a constitution, manufacturing steps can be simplified, since the end surface seal member does not have to be removed. Especially, in a case where the end surface seal member is allowed to disappear during the firing, the end surface seal member is preferably formed of a combustible substance which does not disappear or is not deformed during drying and which disappears during the firing. Preferable examples of the end surface seal member include an end portion surface seal member made of polyvinyl chloride or the like.

Furthermore, in the manufacturing method of the plugged honeycomb structure of the present embodiment, a mask may be used. In this case, when the plugged honeycomb structure precursor is fired, the mask to cover openings of the cells other than predetermined cells may disappear. In this case, since both of the end surface seal member and the mask are allowed to disappear during the firing, a step of removing the mask can be omitted, and the manufacturing steps can be simplified.

It is to be noted that in the manufacturing method of the plugged honeycomb structure according to the present embodiment, a catalyst may be carried at an inner surface and/or an inner portion of each partition wall of the plugged honeycomb structure obtained by the above method. For example, when the plugged honeycomb structure is used as a DPF, it is preferable to carry a catalyst having a function of promoting combustion of the deposits (particulate substances) trapped by the partition walls. Preferable examples of such a catalyst include noble metals such as Pt, Pd and Rh and a perovskite type catalyst made of a non-metal. A method of carrying the catalyst may be performed according to a method of carrying the catalyst on a filter such as the conventional DPF.

EXAMPLE

The present invention will hereinafter be described more specifically in accordance with examples, but the present invention is not limited to these examples.

Example 1

A cordierite forming material including talc, kaolin and alumina as a main material for use as a forming material was blended with water and a binder, dispersed, mixed and kneaded to obtain the forming material. The material was extruded into a columnar shape with a clay kneader, and formed with an extrusion forming machine. The material was extruded and formed using a die to obtain a formed body so that a cell structure including rectangular cells at 12 mil/300 cpsi (0.30 mm/46.5 (cells/cm$^2$)) with a cell pitch of 1.47 mm was obtained. Subsequently, opposite end surfaces of the resultant formed body were alternately plugged, dried and fired to obtain a honeycomb structure provided with an outer wall. Afterward, the resultant honeycomb structure provided with the outer wall was subjected to a plugging method shown in FIGS. 1(a), (b) and (c).

As a plugging material, the cordierite forming material including talc, kaolin and alumina as the main material was used in the same manner as in the honeycomb structure, and water, polyethylene, a thermally foamable resin and a water-absorbing resin were added to the material of 100 parts by weight at ratios of 20 parts by weight of water, 10 parts by weight of the thermally foamable resin, 0.5 part by weight of the water-absorbing resin and 0.5 part by weight of polyethylene. Slight amounts of methyl cellulose, glycerin and a surface active agent were added to and blended with the material to obtain the plugging material.

This plugging material having plasticity was press-fitted into a gap between a stationary mold having a large of round depressions and a forming plate similarly having round depressions to fill the gap. In consequence, a large number of round plugging members 12 were formed. Subsequently, the forming plate was removed, and the honeycomb structure was pressed onto the stationary mold into which the plugging members were fitted. In consequence, the plugging members were inserted into cells to form plugging portions in the cells. Subsequently, the plugging portions were dried. While the plugging material had the plasticity, the foam resin foams and expands. While the plugging members were firmly secured in the cells, a water content was evaporated. After the drying, the honeycomb structure provided with the plugging portions were again fired to fire the plugging portions, and the plugging portions made of the same cordierite as that of the honeycomb structure were formed. Even when the honeycomb structure was subjected to the plugging step before fired and the honeycomb structure and the plugging portions were simultaneously fired, the plugging portions made of the same cordierite as that of the honeycomb structure were formed.

The plugged honeycomb structure obtained by the manufacturing method according to the present invention is preferably used as a filter for dust collection to be used in applications including an environmental countermeasure such as pollution prevention, recovery of a product from a high-temperature gas and the like, especially as a filter for dust collection to be used in a corrosive gas atmosphere at a high temperature, for example, a diesel particulate filter (DPF) to trap particulates to be discharged from a diesel engine, in various fields of chemistry, electric power, iron and steel, industrial waste disposal.

What is claimed is:

1. A manufacturing method of a plugged honeycomb structure in which plugging portions are formed at opening end portions of predetermined cells on one side of a cylindrical honeycomb structure including a plurality of cells separated from one another by porous partition walls, constituting channels of a fluid and formed in a honeycomb-like shape, the method comprising:

forming plugging members into a predetermined shape on a holding portion of a stationary mold, the plugging members being arranged on the holding portion in a predetermined plugging pattern; and pressing the stationary mold onto an end surface of the honeycomb structure after the plugging members have been formed into the predetermined shapes on the holding portion of the stationary mold in order to press-fit the plugging members into the end portions of the predetermined cell passages to be plugged, thereby forming the plugging portions, wherein the plugging members which are formed into the predetermined shape and which are to be press-fit into the cell passages to be plugged include a plastic material having viscosity and fluidity.

2. The manufacturing method of the plugged honeycomb structure according to claim 1, wherein the plugging members include a thermally foamable resin and/or a water-absorbing resin.

3. The manufacturing method of the plugged honeycomb structure according to claim 1, wherein the plugging members include a gelatinous substance.

4. The manufacturing method of the plugged honeycomb structure according to claim 1, wherein the plugging members include at least one selected from the group consisting of gelatin, agar, bean curd, devil's-tongue starch, starch and silica gel.

5. The manufacturing method of the plugged honeycomb structure according to claim 1, wherein the plugging members reach predetermined positions in the cell passages and then expand by heating or absorbed water, whereby the plugging portions are formed by being fixed in the cell passages, the predetermined positions corresponding to portions of the plugging members that are furthest inside of the cell passages.

6. The manufacturing method of the plugged honeycomb structure according to claim 1, wherein the plugging members are positioned at predetermined positions in the cell passages to be plugged to form the plugging portions.

7. The manufacturing method of the plugged honeycomb structure according to claim 1, wherein the predetermined shape is formed to be bonded to the partition walls without using any bonding material.

8. The manufacturing method of the plugged honeycomb structure according to claim 1, wherein the plugging members are formed into a ball-like shape having a tapered tip.

* * * * *